May 13, 1958  D. W. ROSTRON  2,834,667
METHOD OF THERMALLY REDUCING TITANIUM OXIDE
Filed Nov. 10, 1954
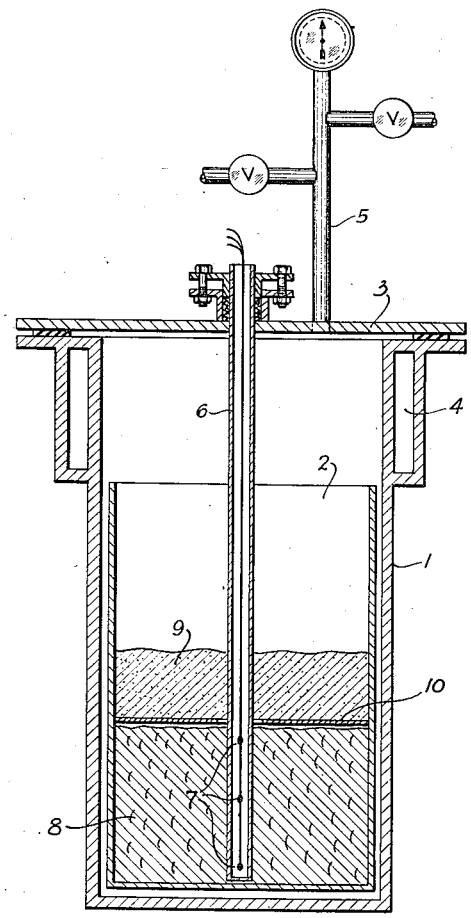
INVENTOR.
Douglas W. Rostron
BY Alex. E. MacRae
Attorney.

United States Patent Office 2,834,667
Patented May 13, 1958

2,834,667

METHOD OF THERMALLY REDUCING TITANIUM OXIDE

Douglas W. Rostron, Haley, Ontario, Canada, assignor to Dominion Magnesium Limited, Toronto, Ontario, Canada Application November 10, 1954, Serial No. 468,097

14 Claims. (Cl. 75—.5)

This invention relates to the thermal reduction of titania in the production of the metal titanium, which metal is becoming of increasing importance in metallurgy.

Because of the difficulty of producing the metal from its ore or compound the metal is not readily available for many commercial uses. An effective method for reducing the dioxide to metal has not been available. Titanium metal is produced by introducing titanium chloride ($TiCl_4$) as a liquid to a reaction chamber containing molten magnesium under an inert atmosphere. Previous workers have concluded that the dioxide cannot be effectively reduced to the metallic state with magnesium (Kroll, Trans. Electrochem. Soc. (1940), 35–47; Chretien and Wyss, Compt. Rendu. 224 (June 9, 1947), 1647–43). It has been proposed to reduce titanium dioxide to the gray black oxide with one reducing agent and to reduce the TiO to metal with another reducing agent.

It has now been found, pursuant to the present invention, that $TiO_2$ can be effectively reduced to a highly useful metal by direct thermal reduction with magnesium to produce a product containing not substantially less than 90% titanium and after leaching the product to remove MgO further reducing it with calcium as hereinafter described.

In accordance with the invention there is uniformly mixed with titanium dioxide particles magnesium metal particles all passing through a 4 mesh screen in an amount at least 100% of the theoretical amount required to reduce the titanium dioxide, and particles of magnesium chloride as a fluxing agent in an amount not substantially less than 40% by weight of the titanium dioxide. The intimate mixture is heated in an inert atmosphere to a temperature not substantially less than 1000° C. to reduce the dioxide to at least 90% titanium. The reaction mass after cooling is crushed and leached with hydrochloric acid to remove magnesium oxide, magnesium chloride and residual magnesium. The leached product is then filtered from the solution, washed and dried.

Uniform mixing of the mass to be reacted is important in insuring high level reduction of the dioxide but it has been found impossible to completely remove the oxygen. The fluxing agent insures control of the reaction rate and the peak temperatures during the exothermic reaction and prevents the formation of insoluble compounds such as titanates.

In leaching the crushed reaction mass is added to and agitated with an aqueous solution containing 10 to 20 grams per liter of hydrochloric acid at a rate to maintain the leaching solution at a temperature not exceeding 25° C. to avoid oxidation and minimize hydrogen pickup: The solids are washed with water and given a further leach with an aqueous solution containing 30–50 grams per liter of hydrochloric acid while maintaining the temperature as above described. A solution to solids ratio of substantially 10 to 1 is preferably maintained during leaching.

The second stage reduction is effected with calcium metal in the form of particles passing through a 4 mesh screen. Particles of the primary reduction product are intimately mixed with the calcium particles in an amount at least 100% in excess of that required to reduce the product and calcium chloride, as a fluxing agent, in an amount not substantially less than 100% by weight of the primary product. The intimate mixture is then heated in an inert atmosphere to a temperature not substantially less than 1000° C. to complete the reduction. The reaction being exothermic, the temperature naturally rises. The reduction should be continued for a period of at least 3 hours after the reaction has been initiated to insure complete reduction. The relatively high proportion of the fluxing agent appears to be beneficial in the removal of the calcium oxide formed from the reaction and thus assists in driving the reduction to completion.

The reaction mass after cooling and crushing is leached in the same manner as that of the primary stage reduction as above described except that following the initial leach the product is ground in water, to which hydrochloric acid may be added, to reduce the particle size to insure removal of all the reaction by-products in the subsequent leaching operation. The temperature of the leaching solution is not allowed to exceed 25° C.

In order to insure a high grade final product, having the required mechanical properties, the primary reduction product should contain at least 90% titanium. Since magnesium is less expensive than calcium, the reduction cost is reduced while raising the quality of the metal produced.

As illustrative of the ductility and mechanical properties of the titanium produced, the following figures are given.

Ultimate tensile strength_____p. s. i__ 96000
.2% proof stress_____p. s. i__ 82650
Elongation in 2" bar_____percent__ 21

The accompanying drawing illustrates a form of apparatus which may be used to carry the reduction.

In the drawing 1 is a reaction vessel in which the charge container 2 is placed. The vessel is sealed by a closure 3 and is provided with a water cooling jacket 4. The conduit 5 is connected to a vacuum pump and to a source of argon or the like and carries a pressure gauge. A protection tube 6 for carrying thermocouples 7 may be inserted for measuring the temperature at various levels the charge in the container. The charge 8 in the container is covered by an insulation layer 9 to retain magnesium vapour within the charge. Dry lime provides effective insulation. It may be separated from the charge by a plate 10 as shown. The insulation enables the uniform heating of the charge and the retaining of reducing agent vapours within the reaction mass to insure uniform and maximum reduction. The reaction vessel may be heated in any desired way. The insulating layer is placed over the premixed reaction mixture of the charge.

The calcium reduction as described, has been found effective in purifying titanium scrap metal which accumulates in the fabrication and use of titanium and its alloys and which becomes superficially oxidized.

It should be stated that because some hydrogen generated in the initial leaching of the calcium reduction product is absorbed by the titanium particles it is easy to grind the final product to powder particle size useful in powder metallurgy. The hydrogen present in the final product is in such relatively small quantity that the powder may be pressed into powder metallurgy forms or compacts and the hydrogen removed by sintering without undue shrinkage of the pressed form.

This application is a continuation-in-part of application Serial Number 165,252, filed May 31, 1950, now abandoned.

What is claimed is:

1. In the production of titanium metal the method which comprises uniformly mixing with titanium dioxide particles magnesium metal particles all passing through a 4 mesh screen in amount at least 100% of that required to reduce the titanium dioxide, and with particles of magnesium chloride in an amount not substantially less than 40% by weight of the titanium dioxide, heating the mixture in an inert atmosphere to a temperature not substantially less than 1000° C. to reduce the dioxide to at least 90% titanium, leaching the reaction mass with hydrochloric acid, removing the reduced titanium oxide, crushing and leaching it to remove magnesium oxide, magnesium chloride and residual magnesium.

2. The method defined in claim 1 wherein the product is mixed with calcium metal particles all passing through a 4 mesh screen and in amount at least 100% in excess of that required to reduce the titanium product to metal and with calcium chloride particles in an amount not substantially less than 100% by weight of the titanium product, heating the mixture in an inert atmosphere to not less than substantially 1000° C. to reduce the titanium product to substantially pure metal, leaching the reaction mass with hydrochloric acid, removing the titanium metal product, crushing it and adding it to dilute hydrochloric acid at a temperature not substantially exceeding 25° C.

3. A method of reducing titanium dioxide to metal which comprises intimately mixing titanium dioxide particles with magnesium particles all passing through a 4 mesh screen in an amount at least 100% of that required to reduce the titanium dioxide and with not less than 40% by weight of magnesium chloride, heating the intimate mixture in an inert atmosphere to 1000° C. to cause reduction of the dioxide to at least 90% titanium, leaching the reaction mass with hydrochloric acid, separating the reduced titanium oxide, intimately mixing it with calcium particles all passing through a 4 mesh screen in an amount at least 100% in excess of that required to reduce the oxide and with 100% by weight of calcium chloride, heating the intimate mixture in an inert atmosphere to 1000° C. continuing the reduction for not substantially less than three hours to complete the reduction, crushing and leaching the reaction mass with an aqueous solution containing 10–20 grams per liter of hydrochloric acid at a temperature not substantially exceeding 25° C., removing the partially leached product, grinding and leaching the ground metal particles in an aqueous solution containing substantially 30–50 grams per liter of hydrochloric acid at a temperature not substantially exceeding 25° C.

4. The method defined in claim 1, wherein the premixed reaction mixture is heated under an insulating layer of dry lime.

5. The method defined in claim 3, wherein the premixed reaction mixture in each reduction stage is heated under an insulating layer of dry lime.

6. A method of purifying titanium scrap metal which comprises intimately mixing particles of titanium-containing scrap metal with calcium particles all passing through a 4 mesh screen in an amount at least 100% in excess of that required to remove oxygen and with 100% by weight of calcium chloride, heating the mixture in an inert atmosphere to not substantially less than 1000° C. to remove oxygen, leaching the reaction mass with hydrochloric acid, separating the purified metal and agitating it in a dilute solution of hydrochloric acid at a temperature not substantially exceeding 25° C.

7. In the production of titanium metal the method which comprises intimately mixing particles of only partially oxidized titanium with calcium particles all passing through a 4 mesh screen and in an amount at least 100% in excess of that required to reduce the oxidized titanium to metal and with 100% by weight of calcium chloride, heating the mixture in an inert atmosphere to not substantially less than 1000° C. to remove oxygen, leaching the reaction mass with hydrochloric acid, separating the purified metal with absorbed hydrogen, crushing it to powder form, compacting the powder and sintering it to expel hydrogen.

8. In the production of titanium metal in powder form which comprises intimately mixing particles of only partially oxidized titanium with calcium particles all passing through a 4 mesh screen in an amount at least 100% in excess of that required to reduce the oxidized titanium to metal and with 100% by weight of calcium chloride, heating the mixture in an inert atmosphere to not substantially less than 1000° C. to remove oxygen, leaching the reaction mass with hydrochloric acid at a temperature not substantially exceeding 25° C., removing the partially leached product, grinding it to powder and leaching the ground metal in an aqueous solution containing substantially 30–50 grams per liter of hydrochloric acid.

9. A method of producing titanium metal which comprises uniformly mixing with particles of titanium dioxide particles of magnesium metal all passing through a 4 mesh screen in an amount at least equal to 100% of that required to reduce the titanium dioxide and with magnesium chloride as a flux to control the reaction rate and peak temperature when the mass is heated, heating the mixture in an inert atmosphere to a temperature not substantially less than 1000° C. to substantially reduce the dioxide, cooling and leaching the reaction mass, separating the partially reduced oxide and drying it, mixing it with calcium particles all passing through a 4 mesh screen and with calcium chloride as a flux, heating the mixture in an inert atmosphere at a temperature of not substantially less than 1000° C. to reduce the partially reduced oxide to substantially pure metal, leaching the reaction mass and separating the metal.

10. The method of producing metal selected from the group consisting of zirconium and titanium, comprising mixing an oxide of the selected metal with magnesium metal, using the magnesium in excess of that theoretically needed to effect complete reduction, heating the mixture in inert gas to a temperature not less than 1000° C. for a period of time sufficient to melt the magnesium, to cause it to react with said oxide to effect a partial reduction, cooling the mixture, leaching, drying the partially reduced oxide, mixing it with commercial calcium, using the calcium in excess of that theoretically needed to effect complete reduction, heating the mixture in an inert gas to a temperature not less than 1000° C. for a period of time sufficient to melt the calcium, to cause it to react with the partially reduced oxide and liberate the selected metal in powder form, leaching and drying the separated powder.

11. A method of producing titanium metal which comprises mixing an oxide thereof with magnesium metal as a reducing agent, using the reducing metal in excess of that needed to effect complete reduction, heating the mixture in inert gas to a temperature not less than 1000° C. for a period of time sufficient to melt the reducing agent, to cause it to react with said oxide to effect a partial reduction, cooling the mixture, leaching and drying the partially reduced oxide, mixing it with calcium metal as a reducing agent in an amount in excess of that theoretically needed to effect complete reduction, heating the mixture in an inert gas to a temperature not less than 1000° C. for a period of time sufficient to melt the calcium, to cause it to react with the partially reduced oxide and liberate titanium in powdered form, cooling the mixture, leaching and drying the separated powdered titanium.

12. The method of producing zirconium metal comprising mixing an oxide thereof with magnesium, using the magnesium in excess of that theoretically needed to effect complete reduction, heating the mixture in inert gas to a temperature not less than 1000° C. for a period of time sufficient to melt the magnesium, to cause it to react with said oxide to effect a partial reduction, cooling the mixture, leaching, drying the partially reduced oxide, mixing it with commercial calcium, using the calcium in excess of that theoretically needed to effect complete reduction, heating the mixture in inert gas to a temperature not less than 1000° C. for a period of time sufficient to melt the calcium, to cause it to react with the partially reduced oxide and liberate zirconium in powdered form, cooling the mixture, leaching and drying the separated powdered zirconium.

13. The method of producing a metal selected from the group consisting of zirconium and titanium, comprising mixing an oxide of the selected metal with dehydrated alkaline earth metal chloride, using the magnesium in excess of that theoretically needed to effect complete reduction, placing the mixture in a closed reaction zone and surrounded by inert gas, heating the mixture to a temperature not less than 1000° C. for a period of time sufficient to melt the magnesium, to cause it to react with said oxide to effect a partial reduction, cooling the mixture, leaching, drying the partially reduced oxide, mixing it with commercial calcium, using the calcium in excess of that theoretically needed to effect complete reduction, heating the mixture in an inert gas at a temperature not less than 1000° C. for a period of time sufficient to melt the calcium, to cause it to react with the partially reduced oxide and liberate the selected metal in powdered form, cooling the mixture, leaching and drying the separated powdered metal.

14. The method defined in claim 11 wherein the second reaction mass is leached with an aqueous solution of hydrochloric acid and the separated titanium metal is ground in one of a group consisting of water and an aqueous solution of hydrochloric acid at a temperature not exceeding 25° C.

References Cited in the file of this patent

UNITED STATES PATENTS

| | | |
|---|---|---|
| 1,088,909 | Kuzel | Mar. 3, 1914 |
| 1,415,516 | Bridge | May 9, 1922 |
| 1,533,505 | Lubowsky | Apr. 14, 1925 |
| 1,602,542 | Maiden | Oct. 12, 1926 |
| 1,609,970 | Schroeder | Dec. 7, 1926 |
| 1,704,257 | Maiden et al. | Mar. 5, 1929 |
| 1,856,592 | Read | May 3, 1932 |
| 2,427,338 | Alexander | Sept. 16, 1947 |
| 2,537,068 | Lilliendahl et al. | Jan. 9, 1951 |
| 2,561,526 | McKechnie et al. | July 24, 1951 |

OTHER REFERENCES

Annales de Chimie (Wyss), vol. 3, series 12, pages 215–242 (March–April 1948) (pages 234–238 relied on).